United States Patent
Sollee et al.

(10) Patent No.: US 6,393,288 B1
(45) Date of Patent: May 21, 2002

(54) METHOD OF IDENTIFYING MOBILE STATION LOCATION TO ESTABLISH HOMEZONE FEATURE

(75) Inventors: Patrick N. Sollee; Anthony Keaton Holton, both of Richardson, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/989,700

(22) Filed: Dec. 12, 1997

Related U.S. Application Data

(60) Provisional application No. 60/064,309, filed on Nov. 5, 1997.

(51) Int. Cl.[7] ................................................. H04Q 7/20
(52) U.S. Cl. ......................... 455/445; 455/433; 455/456
(58) Field of Search ................................. 455/406, 432, 455/433, 445, 456, 407, 408, 409

(56) References Cited

U.S. PATENT DOCUMENTS

| | | | |
|---|---|---|---|
| 5,307,400 A | * | 4/1994 | Sawyer et al. ................. 379/59 |
| 5,537,610 A | * | 7/1996 | Mauger et al. ................ 379/58 |
| 5,539,924 A | * | 7/1996 | Grube et al. ................. 455/456 |
| 5,594,947 A | * | 1/1997 | Grube et al. ................. 455/509 |
| 5,673,308 A | * | 9/1997 | Ashavan ....................... 379/61 |
| 5,684,859 A | * | 11/1997 | Chanroo et al. ............... 379/58 |
| 5,845,211 A | * | 12/1998 | Roach, Jr. .................... 455/436 |

* cited by examiner

Primary Examiner—Edward F. Urban
Assistant Examiner—Tilahun Gesesse
(74) Attorney, Agent, or Firm—John D. Crane

(57) ABSTRACT

A method of establishing call termination to a mobile station of a called subscriber in a fixed wireless communication network which can be only allowed to receive call terminations in one of its HomeZones. The identification and location of the MS is ascertained prior to routing a call to the switching center serving the MS. The radio link between the serving switching center and the MS is maintained and used to terminate a call if the MS is determined to be within a HomeZone. The present invention eliminates the need to page a MS twice thereby speeding up the call termination. The MS provides its location area code and Cell ID to the serving/visited mobile switching center to facilitate the SCP identifying the MS's location prior to routing the call termination to the MS. The HomeZone call may be routed to a mobile station voicemail if it is determined to be outside its HomeZones, or, terminated to the mobile station but at a higher wireless billing rate.

16 Claims, 1 Drawing Sheet

METHOD OF IDENTIFYING MOBILE STATION LOCATION TO ESTABLISH HOMEZONE FEATURE

This application claims priority under 35 USC § 119 (e) (1) of provisional application Ser. No. 60,064,309, filed Nov. 5, 1997.

FIELD OF THE INVENTION

The present invention is generally related to wireless communications systems, and more particularly to fixed wireless systems provided with HomeZone service whereby subscribers are provided communications service, and billed accordingly, depending on whether or not a subscriber's mobile station (MS) is located within one of its designated HomeZones.

BACKGROUND OF THE INVENTION

The implementation of wireless communications systems throughout the world is growing rapidly. This can be seen by the extensive sales and marketing of mobile cellular phone service throughout North America as well as the rest of the World. Existing and emerging technologies include AMPS, TDMA, CDMA, and GSM just to name a few. In these systems, a subscriber of an MS is typically billed for calls at a rate determined by a plan contracted to by the subscriber of the MS, whereby the rate per minute may be based on the time of day, the amount of use and the geographical location of the MS during a call.

Another emerging wireless communication system is known as a fixed wireless system. In many parts of the world including Europe and Asia, subscribers are being provided with wireless communication transceivers e.g. mobile stations as their primary communication device for use within a residence, business and other defined locations. These fixed wireless transceivers are specially suitable where wireline services are to date not available, inadequate, or exceptionally expensive to install. With the decreasing cost of wireless transceivers and supporting infrastructure, those places of the world in need of new or upgraded communication systems are finding fixed wireless systems as economically attractive and versatile solutions.

In fixed wireless communication systems, a subscriber's mobile station is assigned to one or more HomeZones. Each HomeZone defines a geographical home area in which the wireless mobile station is to receive and originate wireless calls at a predetermined low billing rate. While it is primarily intended that a subscriber will primarily use its mobile station within the HomeZone areas, these mobile stations may be transported by a subscriber outside the HomeZone calling areas and may be allowed to originate or receive calls outside the HomeZone area at another predetermined billing rate.

The HomeZone service allows telecommunications providers to define the HomeZone calling areas for their MSs, where the tariff for calls originated and terminated in one of the HomeZones is different than the regular wireless tariff. The HomeZone service is attractive for telecommunications providers wanting to offer both fixed wireless and wireless services to subscribers over one mobile phone. One of the significant costs in providing wireline services is laying copper to each subscribers home. HomeZone service eliminates this cost by using wireless systems which don't require the cost of laying copper. The HomeZone service allows the provider to charge subscribers a particular tariff when they use their mobile station in one of their HomeZones at their wireline rate, and at another tariff when they use their mobile station outside their HomeZones at their wireless rate. The wireline rate is usually less expensive than the wireless rate. This attractive to consumers because they are charged the same low rates in their Homezone as they would have been charged by a wireline provider but without the hassle of multiple phones bills.

As part of the HomeZone feature, on call termination, the location of the mobile station must be determined before the call is routed to the network access element, such as a visitors mobile switching center (VMSC), currently serving the mobile station, so that the network can potentially disallow or reroute the termination if the subscriber's mobile station is not in one of is HomeZones. There is a need to provide a method for determining whether a mobile station is located in one of its HomeZones, and also a method for speeding up the potential termination to the mobile station that may follow.

SUMMARY OF THE INVENTION

The present invention achieves technical advantages as a method of establishing call termination to a called mobile station in a wireless communication network which can be only allowed to receive call terminations in one of its HomeZones by determining the mobile station's location and identity before completing a call termination to the network access element currently serving the mobile station.

In the preferred embodiment of the present invention, the method comprises first determining if a call termination received by a wireless communication network is a HomeZone type call. This may be done, for instance, at a gateway MSC by identifying prefix digits attached to the call. Upon determining that the call termination is a HomeZone type call, the location of the called mobile station to the cell level is first identified in the wireless communication network before routing the call termination to a network access element currently serving the mobile station. It is then determined if the identified location (e.g. serving cell of the mobile station) is within one of the mobile station's HomeZones. If the mobile station's location is determined to be within one of the mobile station's HomeZones, then the call termination is routed to the network access element currently serving the mobile station, and the call termination is completed to the mobile station by the network access element currently serving the mobile station. Preferably, the network access element comprises an MSC, but could comprise other equivalent network devices. If the mobile station is determined to be outside its HomeZones, the call may be routed by the network to the mobile stations voicemail, or to an associated wireless phone number and billed accordingly.

According to the present invention, a mobile station radio link is established between the MSC currently serving the mobile station and the mobile station during the mobile station location process, wherein the call termination is completed to the mobile station on the same mobile station radio link. The radio link is preferably established by sending a PSI message from a HLR to the MSC currently serving the mobile station and paging the mobile station, whereby the mobile station then responds to the page with a page response to the serving MSC. If the mobile station is currently on a call, the location of the MS is known to the serving MSC and is returned to the HLR. If a subsequent termination arrives at the serving MSC, then the call termination to the mobile station is completed if the MS is configured to receive multiple calls e.g. call waiting, without establishing a new radio link between the MSC serving the mobile station and the mobile station.

A PAGE_RESPONSE message which includes the mobile station's identity is generated in response to the page message by the mobile station. The identity included in the PAGE_RESPONSE message comprises preferably either the mobile station's International Mobile Subscriber Identity (IMSI) or Temporary Mobile Subscriber Identity (TMSI). If the response contains the TMSI, the TMSI is used by the serving MSC to find the IMSI. The page response also includes the mobile station's current Cell ID and the mobile station's current location area code (LAC). The mobile station's identity, LAC, and Cell ID are all sent by the MSC serving the mobile station to the home location register (HLR) of the mobile station. The mobile station's identity, LAC and Cell ID are then sent to a service control point (SCP) of the wireless communication network. The SCP determines if the mobile station is in one of the mobile station's HomeZones. If the SCP determines the mobile station is in one of its HomeZones, the SCP notifies the gateway MSC of the wireless communication network to complete the call termination to the mobile station. If the mobile station is determined to be outside its HomeZones, the call may be routed by the SCP to the mobile station's voicemail, or to an associated wireless phone number and billed accordingly.

The present invention achieves technical advantages by determining the location of the mobile station to the cell level before the call is routed to the serving MSC, and speeding up the potential call termination to the mobile station that may follow.

DESCRIPTION OF THE PREFERRED EMBODIMENT

Figure 1:
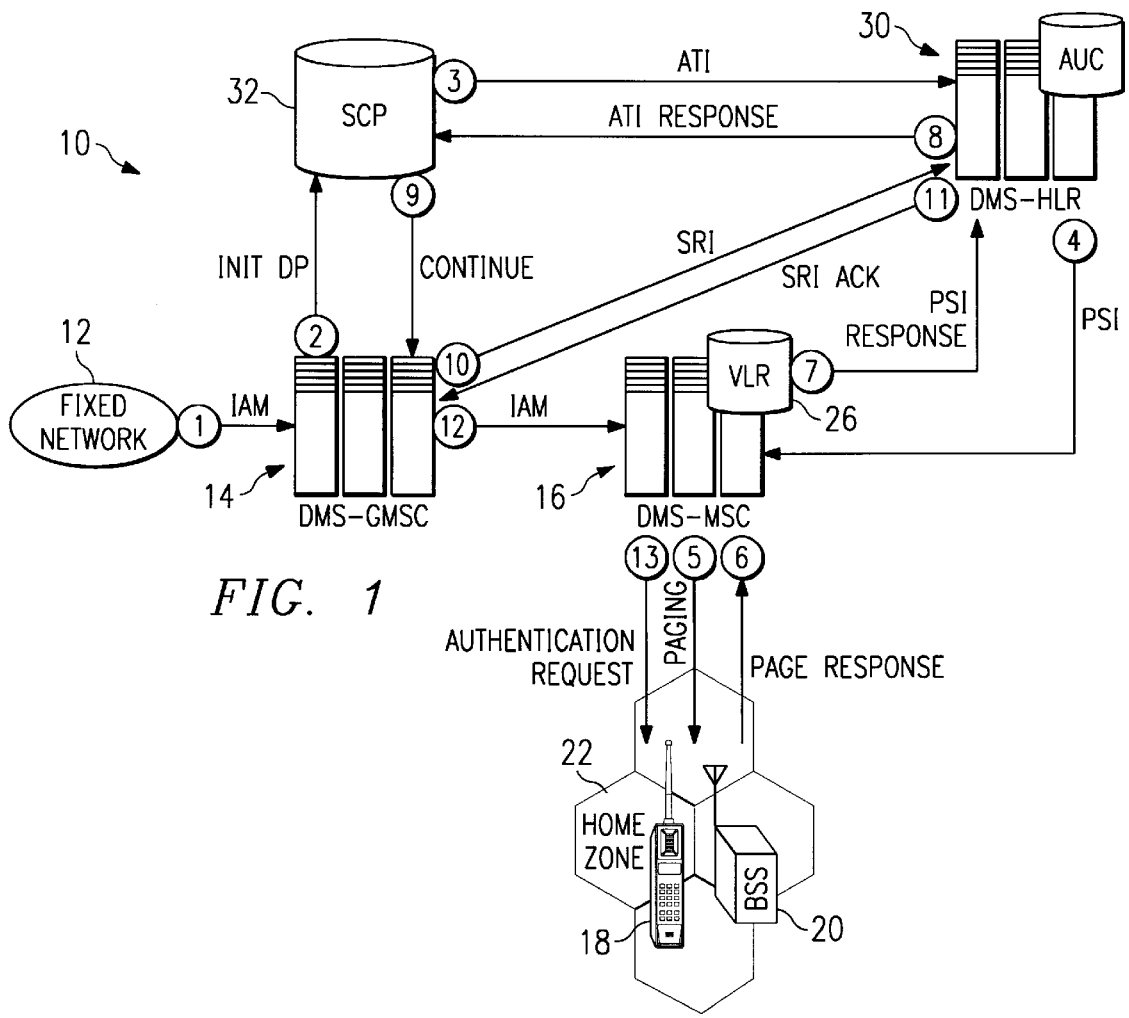
Referring now to FIG. 1, there is illustrated a typical fixed wireless communication network generally which is well suited to benefit from the method of the present invention.

Referring now to FIG. 1, there is generally shown at 10 a typical fixed wireless communication network which is adapted to provide HomeZone service according to the method of the present invention. The network 10 is seen to comprise a fixed network 12 which may comprise a public switched telephone network (PSTN), a gateway mobile switching center (GMSC) 14 and a subscriber switching center 16 which may be a MSC, serving a wireless mobile station (MS) 18 via a base switching station (BSS) 20. MS 18 is seen to be assigned to one or more HomeZone location areas, one HomeZone area generally shown at 22, which may be one geographic cell area served by BSS 20. Associated with the serving/visited switching center MSC 16 is a visitors location register (VLR) 26. A home location register (HLR) 30 is assigned to handle all of the MS 18 information, including the address of the MSC currently serving the MS, service capabilities, etc. A service control point (SCP) 32 interfaces with the GMSC 14 and HLR 30.

The present invention provides a method to determine if the MS 18 subscribing to a HomeZone service is in one of its HomeZones 22 before routing a call termination to the network access element 16 serving the MS, such as MSC 16. One HomeZone 22 may be a subscriber's office, another HomeZone 22 may be a subscriber's home and so forth. The present invention allows the network 10 to potentially disallow the termination of a call to the MS 18 if the MS is not in one of its HomeZones 22. The present invention also provides a method to precisely determine the MS's location. In addition, the present invention speeds up the potential termination to the MS that may follow by using the same radio link in the call termination that was used to find the mobile stations location.

Figure 2:
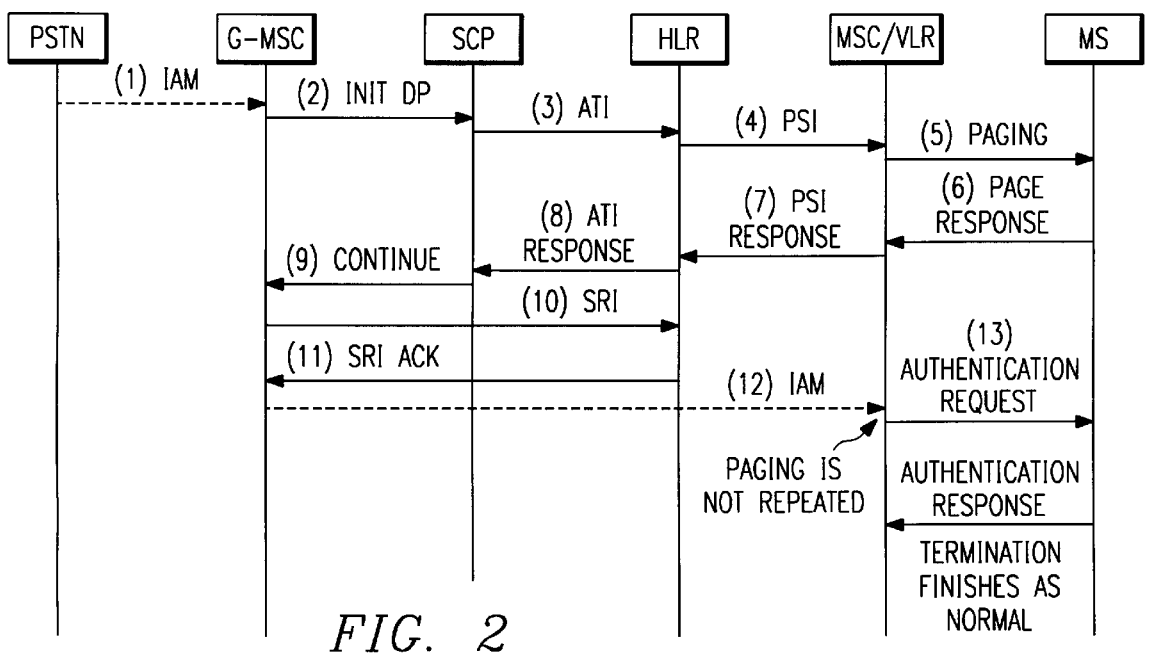
FIG. 2 is flow diagram of a method of identifying a mobile station location to provide HomeZone service according to the present invention.

By way of illustration, but without limitation to the specific implementation that will soon be described, reference is made to the network of FIG. 1 and the message flow of FIG. 2 which illustrates the preferred embodiment of the present invention to provide the HomeZone feature. The present invention is illustrated and described in considerable detail to provide an understanding of implementation and use of the present invention. It is to be understood that some of the basic elements of the network 10 can be substituted with other equivalent network elements to provide the intended function. For instance, the gateway MSC (GMSC) 14 can be substituted with other network access elements e.g. routers, depending on the technology implementing the HomeZone feature. The present invention is ideal for implementation in a GSM network, but can function in other types of networks as well.

With reference to FIG. 1, upon a call termination from the fixed network 12 to GMSC 14, the GMSC 14 determines if the called number is a HomeZone type number. This is preferably done by ascertaining call data e.g. prefix digits provided with a call termination from the fixed network 12, although other methods are possible. The GMSC 14 then queries the SCP 32 to determine if the termination is allowed to the intended MS 18. To determine this, the SCP 32 then queries the HLR 30 to find the location of the MS 18, and specifically, to determine if the MS 18 is located in one of its assigned HomeZones 22. The HLR 30 then queries the MSC 16 known by the HLR 30 to be currently servicing the MS 18, whereby the serving MSC 16 will page the MS 18. The MS 18 responds to the page with a PAGE_RESPONSE message including its exact location including its current location area code (LAC) and current Cell ID, which is known by the mobile station based on broadcast messages by the serving cell. It is noted that the serving MSC 16 will know the LAC that the MS is located in, before paging, but the LAC is not enough information for the SCP to determine if the MS is in one of its HomeZones 22. The PAGE_RESPONSE message also includes the mobile station identify, comprising the mobile station International Mobile Subscriber identify (IMSI) or Temporary Mobile Subscriber Identify (TMSI). If the response includes the TMSI, the TMSI is used by the serving MSC to determine the IMSI.

The MS 18 will provide a page response containing its LAC and Cell ID to the serving MSC 16, which information is then sent to the HLR 30 by the serving MSC 16 for that MS 18. The HLR 30 then sends the LAC and Cell ID to the SCP 32, which then instructs the GMSC 14 if and how to route the call to the MS 18. For example, if the SCP 32 determines the MS 18 is in one of its HomeZones 22, the call will be terminated to the MS 18. If, however, the MS 18 is determined to be outside its HomeZones 22, the call may be forwarded to the voicemail associated with MS 18, or, terminated to an associated wireless phone number, e.g. MSISDN number, associated with the MS 18 wherein the subscriber is billed at the wireless rate, which is usually higher than the wireline rate.

After sending the MS LAC and Cell ID location information back to the SCP 32 via the HLR 30, it is specifically noted that the serving MSC 16 leaves the radio link (RR) connection up in anticipation of a reception of a call termination for that MS 18. A timer at serving MSC 16 having a predetermined stop time e.g. 3 seconds is started at the serving MSC 16 once the MS LAC and Cell ID information has been sent to the HLR upon receiving the PAGE_RESPONSE message from the mobile station 18. If a call termination does not arrive to the serving MSC 16 within the specified time, the established RR connection is then cleared by the serving MSC 16. However, if the call termination does arrive within the predetermined time, the RR connection established between MSC 16 and MS 18 when the location of the MS was determined is then used. Thus, the MS 18 does not need to be paged again. The present invention achieves technical advantages by providing a significant improvement in time and processing over the prior art. The call set up time is improved by not having to page the MS again, by re-using the RR connection that was set up when the location of the MS was first determined.

To more fully understand the preferred embodiment for providing the present invention, reference is now made to the preferred message flow diagram in FIG. 2. The steps illustrated in FIG. 2 correspond to the message number illustrated in FIG. 1. Again, this specific implementation is preferred, although variations are possible and covered by the present invention.

At step 1, the GMSC 14 is seen to receive an incoming call termination seen as an Initial Address Message (IAM) from the PSTN 12. The GMSC 14 then determines if this call termination is to be a HomeZone termination. This is determined by ascertaining a call data e.g. prefix digits provided at the beginning of the call termination which identifies the type of call. At step 2, the GMSC 14 initiates a query message to the SCP 32 by sending an InitDP message. At step 3, the SCP 32 initiates identifying the location of the mobile station 18 by sending an AnyTimeIntegration message (ATI) to the HLR 30.

At step 4 the HLR 30 requests the called MS's location from the VLR 26 associated with the serving MSC 16 using the Provide MS Information (PSI) message.

At step 5, if the mobile station 18 is not on a call, the visited MSC 16 serving the mobile station 18 pages the mobile station 18 to ascertain its location. At step 6, the mobile station 18 responds to this page with a PAGE_RESPONSE message to the serving MSC 16 containing its Location Area Code (LAC) and its Cell ID. In this regard, the present invention uses the PSI message in a novel way to trigger the serving MSC 16 to ascertain the MS 18 location. The MSC 16 starts the 3 second timer upon receipt of the PAGE_RESPONSE message, and leaves the established radio link to the MS 18 up in anticipation of an imminent call termination.

At step 7, the VLR 26 sends this LAC and Cell ID to the HLR 30 in a PSI response message. In step 8, the HLR 30 forwards the LAC and Cell ID information to the SCP 32 using an ATI Response message.

At step 9, based on the specific location information received, the SCP 32 determines if the mobile station 18 is in one of its Home Zone's 22, or if it is outside the HomeZones 22.

At step 10, if the SCP 32 determines in step 9 that the mobile station 18 is in one of its HomeZones 22, the GMSC 14 sends a Send Routing Info (SRI) message to the HLR 30. If the SCP 32, however, determines the MS 18 is out of its HomeZones, the call is either terminated to the voicemail of the MS 18 at the wireline rate, or terminated to the MS 18 but at the wireless rate. The servicing MSC 16 handles billing of the call.

At step 11, the HLR 30 responds to the GMSC 14 with a subscriber MS Roaming Number (MSRN) for the terminating mobile station 18 in the SRI ACK message. The MSRN number is generated by the serving MSC 16 and is included in the PRN ACK message per the GSM standard. At step 12, the GMSC 14 then sends an IAM message to the visited MSC 16.

At step 13, the visited MSC 16 terminates the call as normal, except that the Paging is skipped since it has already been done earlier in step 5, as long as the timer at MSC 16 has not expired. The existing radio link established with MS 18 in step 5 is used. As a result, the Authentication Request message is the first message sent, if authentication is required, to the mobile station 18 after the IAM message is received from the GMSC 14.

The forgoing message flow as described with reference to FIG. 2 in view of FIG. 1 is the preferred implementation of the present invention, however, limitation to these specific messages is not to be inferred by the present invention. The present invention encompasses identifying if a MS is in one of its HomeZones prior to routing a call termination to the serving switching center for the mobile station, and using an existing RR connection to eliminate paging a mobile station a second time if a call termination is to be established. A timer is utilized at the switching center serving the MS, upon which the expiration of the timer of the RR connection is released.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A method of establishing a call termination to a called mobile station (MS) in a wireless communication network, the network including multiple mobile stations, one or more of which is capable of receiving HomeZone type calls, the mobile stations being locatable within or outside of one or more HomeZones, each mobile station being serviceable at any given time by one of a plurality of network access elements in the network as determined by the location of each mobile station within the network, the method comprising:
   a) determining if the call termination received by the wireless communication network is a HomeZone type of call;
   b) if the call termination is a HomeZone type of call, identifying the location of the called MS in the wireless communication network by initiating a radio link between the called MS and the network access element currently serving the called MS;
   c) while maintaining the initiated radio link, determining if the identified location of the called MS is within one of the called MS's HomeZones, and,
   if the MS is determined to be within one of its HomeZones, routing the call termination to the network access element currently serving the called MS; and
   d) establishing, via the maintained radio link, the call termination to the called MS from the network access element currently serving the called MS.

2. A method as in claim 1, wherein the network access element comprises an MSC.

3. A method as in claim 1, wherein the radio link is initiated by receipt of a PSI message by the network access element currently serving the MS and the consequent paging of the MS by the network access element currently serving the MS, the MS then responding to being paged by providing a page response to the network access element via the radio link.

4. A method as in claim 3, wherein the page response includes the MS's identity.

5. A method as in claim 4, wherein the page response comprises either the MS's IMSI or TMSI.

6. A method as in claim 4, wherein the page response includes the MS's Cell ID.

7. A method as in claim 6 wherein the page response also includes the MS's location area code (LAC0.

8. A method as in claim 7, wherein said MS identity, said MS LAC and the MS's Cell ID are sent by the network access element currently serving the MS to a Home Location Register (HLR) of the MS.

9. A method as in claim 8, wherein said MS identity, LAC, and Cell ID are sent to a Service Control Point (SCP) of the wireless communication network; wherein the SCP determines in step c) if the MS is in one of the MS's HomeZones; and, wherein, if the SCP determines the MS is in one of the MS's HomeZones, the SCP notifies a Gateway MSC of the wireless communications network to complete the call termination to the MS.

10. A method as in claim 9, wherein in step d) the call termination is completed to the MS on the same radio link established by paging the MS.

11. A method as in claim 1, wherein, if said MS is currently on a call, the network access element currently serving the MS completes the call termination to the MS if the MS is configured to receive multiple calls without establishing a new radio link between the network access element currently serving the MS and the MS.

12. A method as in claim 1 which, if in step c) the MS location is determined to be outside its HomeZone, includes the further step of routing the call termination to a voicemail of the MS.

13. A method as in claim 1 which, if in step c) the MS location is determined to be outside its HomeZone, includes the further step of routing the call to the MS at a billing rate different from the billing rate applicable when the MS is in one of its HomeZones.

14. A method as in claim 1, wherein the radio link between the called MS and the network access element is maintained for a predetermined time after the location of the called MS is determined, following the passage of which time the radio link is broken unless step d) is effected prior thereto.

15. In a wireless communication network, apparatus for establishing a call termination to a called one of a plurality of mobile station (MS) in the network, one or more of the MS's being capable of receiving HomeZone type calls, the MS's being locatable within or outside of one or more HomeZones, each MS being serviceable at any given time by one of a plurality of network access elements in the network as determined by the location of each MS within the network, the apparatus comprising:

(a) means for determining if a call termination received by the network is a HomeZone type of call;

(b) means responsive to a call termination being a HomeZone type of call for identifying the location of the called MS in the network by initiating a radio link between the called MS and the network access element currently serving the called MS;

(c) means for maintaining the initiated radio link and for
 (i) determining if the identified location of the called MS is within one of the called MS'a HomeZones, and,
 (ii) in response to the MS being determined to be within one of its HomeZones, routing the call termination to the network access element currently serving the called MS; and (d) means for establishing, via the maintained radio link, the call termination to the called MS from the network access element currently serving the called MS.

16. Apparatus as in claim 15, wherein the maintaining means maintains the radio link between the called MS and the network access element for a predetermined time after the location of the called MS is identified, and which further comprises means following the passage of the predetermined time for breaking the radio link unless the call termination has been established.

* * * * *